P. W. ROBSON AND F. J. BRETHERTON.
STABILIZING AND STEERING GEAR FOR VEHICLES USING CHAIN TRACKS.
APPLICATION FILED NOV. 15, 1917.
1,303,822.
Patented May 13, 1919.
2 SHEETS—SHEET 1.
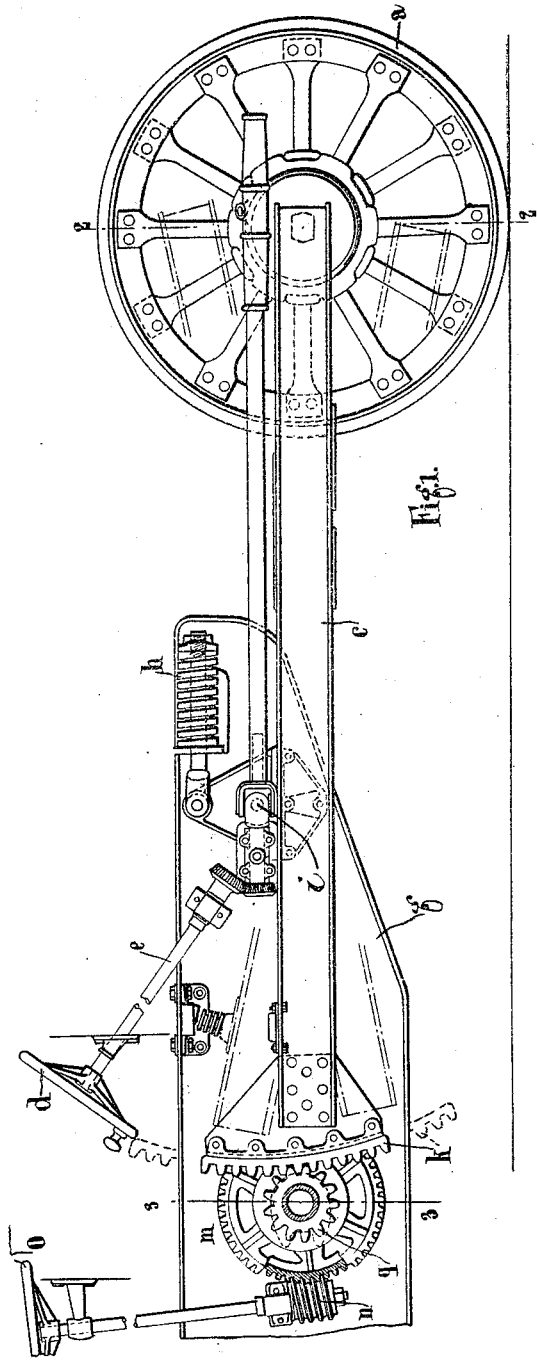
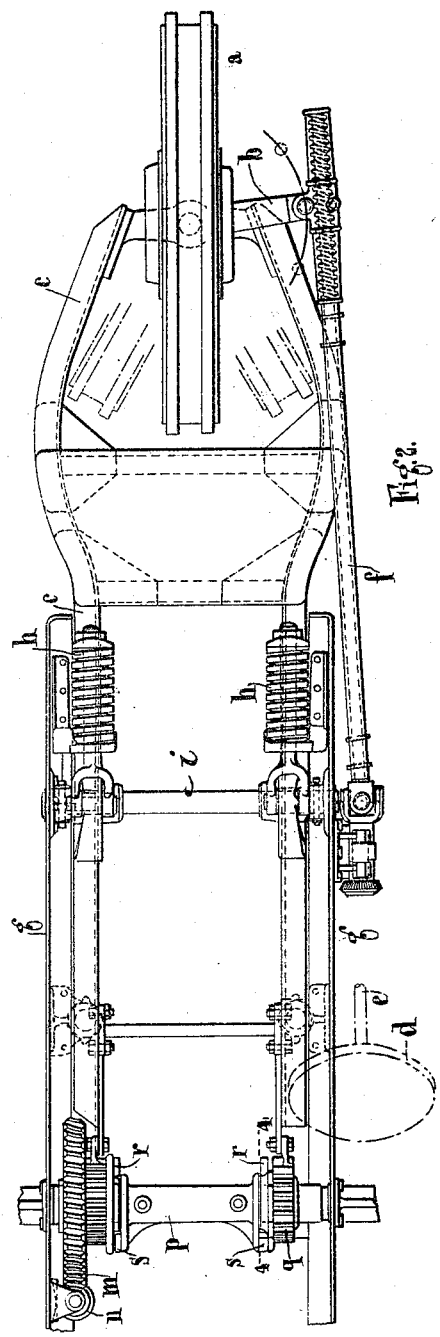
INVENTORS
Philip Warwick Robson
Francis James Bretherton
BY
ATTORNEY

UNITED STATES PATENT OFFICE.

PHILIP WARWICK ROBSON AND FRANCIS JAMES BRETHERTON, OF LINCOLN, ENGLAND.

STABILIZING AND STEERING GEAR FOR VEHICLES USING CHAIN TRACKS.

1,303,822.    Specification of Letters Patent.    Patented May 13, 1919.

Application filed November 15, 1917. Serial No. 202,250.

*To all whom it may concern:*

Be it known that we, PHILIP WARWICK ROBSON and FRANCIS JAMES BRETHERTON, subjects of Great Britain and Ireland, and both residing at Stamp End Works, Lincoln, in the county of Lincoln, England, have invented certain new and useful Improvements in Stabilizing and Steering Gear for Vehicles Using Chain Tracks, of which the following is a specification.

The present invention relates to the stabilizing and steering gear for vehicles using chain tracks.

The invention consists in mounting steering wheels on a frame pivoted to the main frame of the machine so that it can turn freely about a vertical axis and also turn about a horizontal axis, being normally pressed down on to the road by means of springs but capable of being raised by a hand operated mechanism.

The invention further consists in the improved stabilizing and steering gear for vehicles using chain tracks hereinafter described.

Referring to the accompanying drawings:—

Figure 1 is a side elevation of the steering mechanism constructed according to the invention.

Fig. 2 is a plan of the same.

Fig. 3 is a transverse section on the line 3—3, Fig. 1, while

Fig. 4 is a longitudinal section on the line 4—4, Fig. 2.

Figures 3, 4:
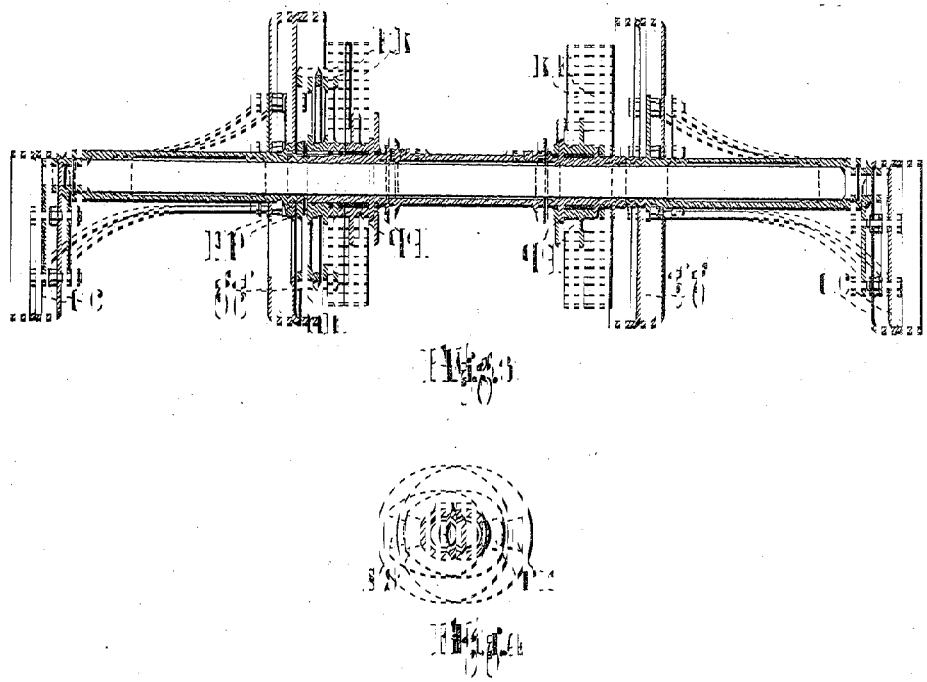

In carrying the invention into effect as illustrated, a steering wheel $a$ is mounted on a frame $b$ capable of turning about a vertical axis on the line 2—2, Fig. 1. The frame $b$ is carried on a frame $c$ capable of turning about a horizontal axis $i$. The movement of the wheel $a$ about the vertical axis is controlled by a steering wheel $d$ through the steering pillar $e$ and bevels, and the shaft $f$ in the usual manner. The frame $c$ is preferably mounted at the front end of the vehicle $g$ and is normally pressed down on to the road by means of springs $h, h$. At the rear end of the frame $c$ there are provided toothed sectors $k$ engaging with free wheel pinion $q$. The movement of the frame about the horizontal axis is controlled by the worm wheel $m$ and worm $n$ actuated by the hand wheel $o$. The worm wheel $m$ is attached to a sleeve $p$. On turned parts of this sleeve there are mounted the two free wheel pinions $q$ having lugs $r$ while the sleeve is provided with lugs $s$ and the pinions $q$ have free angular rotation between the limits imposed by the relative position of the lugs $r$ and $s$.

Since the pinions $q$ engage with the toothed sectors $k$ the relative position of the lugs $r$, $s$, can be adjusted within limits by the worm wheel $m$ operated by the hand wheel $o$ so that the frame $c$ may be either elevated or depressed by the lugs $s$ engaging with the lugs $r$ or left free as illustrated in full lines.

Having now described our invention, what we claim as new and desire to secure by Letters Patent is:—

1. Stabilizing and steering means for vehicles using chain tracks, comprising in combination, a frame pivoted to the main frame of the machine about a horizontal axis, a steering wheel pivoted in said frame, springs adapted to press said steering wheel down on the road, and hand-operated means adapted to raise said frame, as set forth.

2. Stabilizing and steering means for vehicles using chain tracks, comprising in combination, a frame pivoted to the main frame of the machine about a horizontal axis, springs adapted to press said frame downward, hand-operated means adapted to raise said frame, a steering wheel mounted in said frame so that it can pivot about a vertical axis, and means including rotatable shafts and gearing for turning said steering wheel, as set forth.

3. Stabilizing and steering means for vehicles using chain tracks comprising in combination, a frame pivoted to the main frame of the machine about a horizontal axis, a steering wheel carried by said frame, springs adapted to press said frame downward, means for turning said frame about a horizontal axis by hand, including toothed sectors on said frame, free wheel pinions engaging with said sectors, lugs on said free wheel pinions, a sleeve having lugs adapted to engage with said free wheel pinion lugs, and means whereby said sleeve can be turned by hand, as set forth.

4. Stabilizing and steering means for vehicles using chain tracks, comprising in combination, a frame pivoted to the main frame of the machine about a horizontal axis, a steering wheel carried by said frame, a spring adapted to press said frame downward, and hand-operated means whereby said frame can be either elevated or depressed or left free under the action of the springs, as set forth.

In testimony whereof we have signed our names to this specification.

PHILIP WARWICK ROBSON.
FRANCIS JAMES BRETHERTON.

Copies of this patent may be obtained for five cents each, by addressing the "Commissioner of Patents, Washington, D. C."